United States Patent [19]

Evans

[11] Patent Number: 4,625,510

[45] Date of Patent: Dec. 2, 1986

[54] STRESS LIMITER APPARATUS FOR A GAS TURBINE ENGINE

[75] Inventor: Rowland M. Evans, Terrasse Vaudreuil, Canada

[73] Assignee: Bendix Avelex Inc., Montreal, Canada

[21] Appl. No.: 550,702

[22] Filed: Nov. 14, 1983

Related U.S. Application Data

[63] Continuation of Ser. No. 257,027, Apr. 24, 1981, abandoned.

[51] Int. Cl.$^4$ ................................................ F02C 9/28
[52] U.S. Cl. .............................. 60/39.161; 60/39.281; 60/39.282
[58] Field of Search ............ 60/39.281, 39.161, 39.282

[56] References Cited

U.S. PATENT DOCUMENTS

| | | | |
|---|---|---|---|
| 3,790,765 | 2/1974 | Morrison | 60/39.281 |
| 3,956,884 | 5/1976 | Eves | 60/39.28 |
| 4,018,044 | 4/1977 | Joby et al. | 60/39.281 |
| 4,040,250 | 8/1977 | Saunders et al. | 60/39.281 |
| 4,100,731 | 7/1978 | Janes et al. | 60/39.281 |
| 4,171,613 | 10/1979 | Schmidt-Rodenbeck et al. | 60/39.281 |

*Primary Examiner*—Louis J. Casaregola
*Attorney, Agent, or Firm*—Howard Massung; Stan Protigal

[57] ABSTRACT

A stress limiter apparatus for a gas turbine engine (10) is disclosed. A proportional fuel fuel control (11) regulates the fuel flow (Wf) from a hydromechanical unit (36) based upon an error signal (E) representing the difference between a demanded speed signal (Nd) and an actual speed signal (N1). The demanded speed signal (Nd) is generated by an integrator (32) as the time integral of one of the acceleration terms (A1, A2, A3) selected by gate 38. The demanded acceleration term (A1) is generated by junction (26) as the difference between the demanded signal (Nd) and a scheduled speed signal (Ngs). The acceleration terms (A2, A3) are generated by junctions (44, 46) and scheduling means (40, 42) which form stress limiter circuits.

21 Claims, 10 Drawing Figures

STRESS LIMITER APPARATUS FOR A GAS TURBINE ENGINE

CROSS REFERENCE TO RELATED APPLICATION

This is a continuation of co-pending application Ser. No. 257,027, Filed Apr. 24, 1981, now abandoned.

BACKGROUND OF THE INVENTION

The invention pertains generally to a stress limiter apparatus for a gas turbine engine and is more particularly directed to a stress limiter apparatus for an acceleration based closed loop fuel control system of a gas turbine engine.

The closed loop fuel control of gas turbine engines based on acceleration has been successfully implemented in various systems. These systems act directly to control the rate of change of the engine speed as a function of an acceleration term. The acceleration term is formed by differencing a scheduled term with an actual or an implied actual parameter of the gas generator. The actual acceleration of the engine is fed back through changes in the actual term for comparison with the scheduled term. Thus, the acceleration term can be envisioned as the difference between a desired or scheduled acceleration and the actual acceleration. The scheduled acceleration may be a function of any of a number of engine operating parameters including engine speed, ambient pressure, temperature, compressor pressure, etc.

After the acceleration term is formed, it is integrated and the result used to effectively provide a datum for a proportional speed control loop. The speed control loop meters fuel to the engine based upon a proportional multiplication of the difference between the actual engine speed and the integrated acceleration term. Advantages of this form of acceleration control include consistent predictible accelerations which take account of fuel type, temperature, and altitude. The acceleration time of these controls is also generally independent of air bleed and power extraction status.

A closed loop fuel control for a gas turbine engine based on acceleration is more fully disclosed in a U.S. patent application Ser. No. 210,938, filed in the name of Rowland M. Evans, on Nov. 28, 1980, which is commonly assigned with the present application. The disclosure of Evans is hereby expressly incorporated by reference herein. Other examples of closed loop systems of this type are illustrated in U.S. Pat. Nos. 4,018,044; 4,100,731; and 4,040,250.

The acceleration that is requested should be a function of the final desired output power or speed. Generally, it is desired that an acceleration be the safe maximum available from the engine for the particular operating conditions of the engine. Only the physical limitations of the engine should reduce the acceleration capability of the control.

One set of limiting conditions is where the compressor begins to stall and the engine enters a surge condition destructive to the equipment. Therefore, the acceleration and fuel flow must be controlled so that a safe operating margin is maintained between stall conditions and the operating point so the engine does not encounter these problems. On most controls an acceleration limiter, providing predetermined acceleration limits for the acceleration term, is utilized to control the safety factor. When on acceleration limit, the fuel flow to the engine is scheduled by the acceleration limiter without regard to the steady running line of the engine.

However, there are other parameters besides the acceleration limit for the demanded acceleration term that must be controlled to safely operate a gas turbine engine. These include parameters that are related to the physical stress limits of the particular engine. For example, in turbojet engines the turbine temperature should not exceed a designed maximum or engine failure could occur. This is because the turbine blades have a critical temperature which can be exceeded by the maximum gas temperature. Another critical factor is overspeed of the engine beyond a designed maximum. The excess centrifugal forces developed during overspeed can cause the blades on a compressor or turbine to deform or break off. Therefore, if either of these limits is exceeded by excessive margins for even relatively short periods of time, engine damage or complete failure can result.

Other stress limits that must be controlled closely if the gas turbine engine is of the free turbine type, are the free turbine overspeed limit and the free turbine output shaft and/or transmission gearbox torque limit. As with the other engine stress limits, these limits are imposed because the engine can produce forces which exceed the mechanical strength of the free turbine and its rotor shaft, or which can reduce its life.

To prevent overstress of the engine, conventional closed loop fuel controls for gas turbine engines compare a particular stress parameter against a predetermined constant limit value and generate a signal indicating when the limit is exceeded. When the engine is overstressed as indicated by the signal, the fuel flow is reduced by manipulation of the scheduled operating point for the gas generator governor or the acceleration schedule. Both of these techniques entail a delay between the time the limiting parameter is exceeded and the fuel flow is reduced below the engine steady running line. The delay may cause a transient overshoot of the stress parameter beyond its limit and unnecessary overstressing of engine components.

However, if the comparison limit is set below the actual physical value of the stress limit to prevent overshoot, the engine is better protected but at the cost of system response. Therefore, it would be highly desirable to provide a stress limiter apparatus for a gas turbine engine control that not only would eliminate transient overshoot during stress limiting, but also would allow the control to operate as close to the actual stress limit as possible for maximum performance.

SUMMARY OF THE INVENTION

The invention is a stress limiter apparatus for an acceleration based closed loop fuel control of a gas turbine engine characterized by a means for scheduling an acceleration term based upon the difference in values between an actual stress parameter and a predetermined stress limit. Each stress factor of the engine is associated with a different scheduling means to produce several independent acceleration terms based on the particular stress limit. The stress limiter further comprises a "select low" gate disposed between the scheduling means and the integrator of the closed loop fuel control system. The acceleration terms from all the stress limiter scheduling means are compared in the "select low" gate and the smallest acceleration term is chosen to be integrated to become the datum of the system.

Each of the stress limiter schedules generally provides a decreasing positive acceleration term as the engine approaches a particular stress limit. At the stress limit, when the difference between the actual parameter and the limit is zero, a zero acceleration term is scheduled. If the actual parameter is greater than the limit, then an increasing deceleration or negative acceleration is scheduled.

The primary advantage of the stress limiter is that a negative acceleration is scheduled immediately when any stress limiting value is exceeded. A scheduled deceleration independent of the acceleration schedule causes a virtually instantaneous reduction in fuel flow to a value below the steady running line of the engine.

Additionally, large accelerations that would normally cause an overshoot of a limit are cancelled by the "select low" gate. The decreasing positive acceleration terms that are scheduled by the limiters when the engine is approaching a limit are constantly compared to the demanded acceleration term to keep the engine from exceeding a stress limit while in a maximum acceleration mode. If this were not the case, a considerable overshoot caused by exceeding the stress limit while on a maximum acceleration could cause engine damage. This kind of wellbehaved controlled response from the engine allows the predetermined stress limit values to be closer to the physical stress limits of the engine.

These and other objects, features, and aspects of the invention will be better understood and more clearly explained if a reading of the detailed disclosure is undertaken in conjunction with the appended drawings wherein:

DETAILED DESCRIPTION OF THE PREFERRED EMBODIMENT

Figure 1:
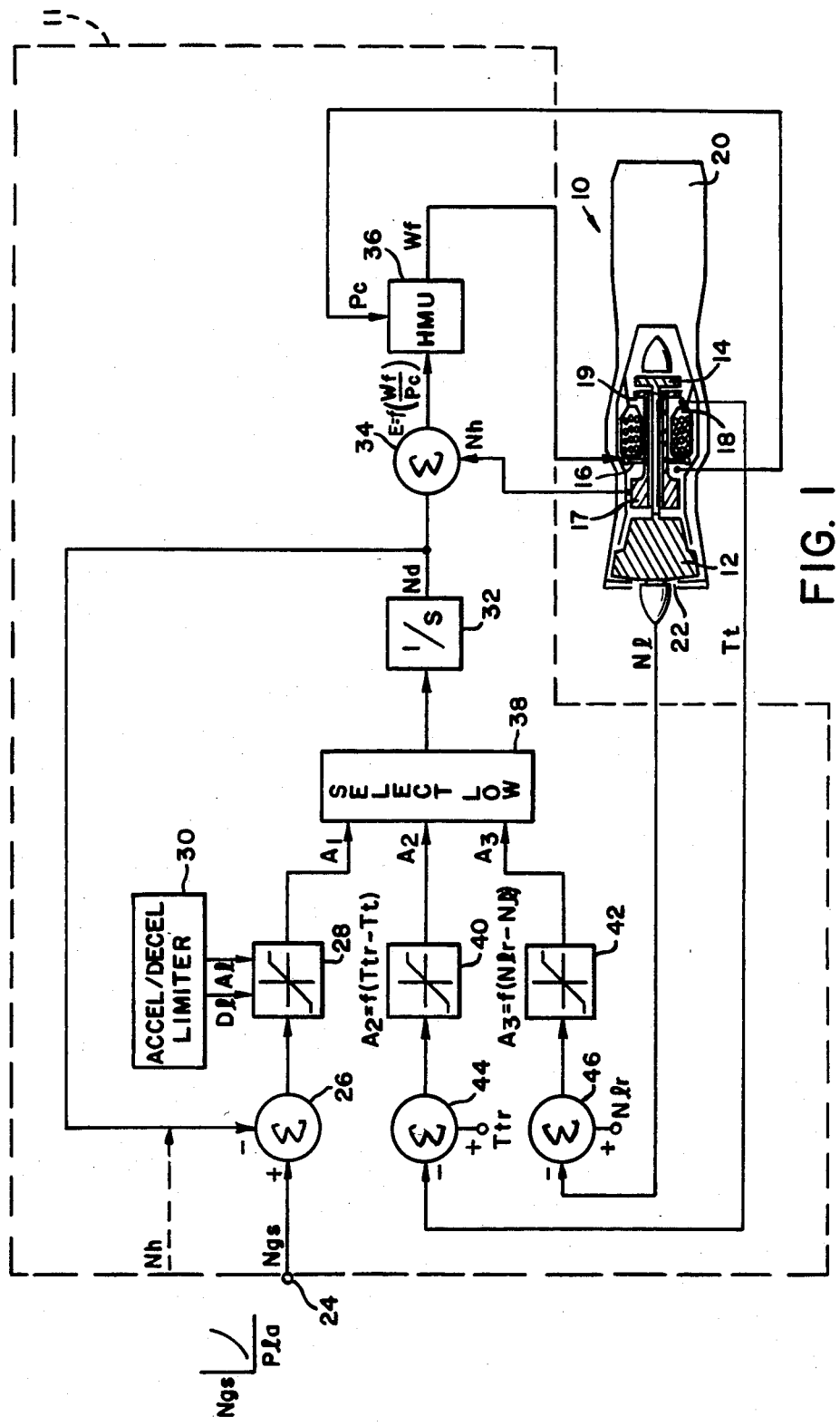
FIG. 1 is a system block diagrammatic view of a fuel control system for a turbojet engine including a stress limiter apparatus which is constructed in accordance with the invention.

With reference to FIG. 1 there is shown a fuel control system 11 for a gas turbine engine which is generally designated 10. The engine 10 includes an intake duct 22 through which air enters. After entering the engine, the air is compressed by a low pressure (LP) compressor 12 and subsequently by a high pressure (HP) compressor 17. Compressors 12 and 17 are of the axial type which produce an increase in pressure and consequently, an increase in the density of the incoming air proportional to their rotational speed. The denser air moves to a fuel supply section where a fuel ring 16 produces a combustible fuel/air mixture by spraying fuel into the incoming air stream. The fuel/air mixture is thereafter ignited and combusted in burners 18 to produce a high velocity exhaust gas.

The exhaust gas, as is conventional in this type of reaction engine exits through a nozzle 20 to produce a forward thrust. A portion of the energy contained in the exhaust gases is expended in rotating a low pressure turbine 14 and a high pressure turbine 19 which are physically attached to the respective compressor by concentrically disposed rotor shafts. Each compressor and turbine combination form a spool which rotates independently from the other. Additionally, after passage through the LP compressor, or part of it, a portion of the incoming air may be channeled into a shroud which bypasses the engine and combines with the exhausted gases upstream of the nozzle. The engine described is a conventional two-spool turbofan engine in which the second or low pressure spool has been added to increase the efficiency of the engine.

Generally, the control of the engine speed, and thus the output power or thrust of the engine, is regulated by the amount of fuel flowing into the fuel ring 16. This fuel flow Wf is modulated by the fuel control 11 to provide more or less energy to the exhaust gas and thus reaction power from the engine. Generally, increasing the fuel flow increases the engine speed and output power while decreasing the fuel flow decreases the engine speed and output power.

The fuel control system 11 is provided for assuring that the control of the engine speed is maintained during steady state operation, accelerations, and decelerations. The fuel control illustrated is based on an input to terminal 24 which is the desired or scheduled rotational speed Ngs of one of the compressor and turbine spool combinations of the engine 10. Signal Ngs can, for example, be generated as the output from a schedule based on the power lever angle (PLA) of the particular device the engine is used on. In its simplest form, the Ngs signal can be generated from a potentiometer that is ganged to the power lever. A typical schedule of Ngs vs PLA is illustrated to the immediate left of terminal 24.

When referring to the engine speed either the high pressure compresor speed (HP spool speed Nh) or the low pressure compressor speed (LP spool speed Nl) is meant because either can be used to control the engine. In this particular embodiment, the controlling parameter of the fuel control will be the HP spool speed Nh. The HP spool speed is chosen as the controlling parameter in this type of engine since it is the more critical to the operation.

By scheduling the commanded speed Ngs to terminal 24 any desired engine power may be obtained since the fuel control varies the power of the gas turbine engine by regulating the engine speed. Thus, the control system operates to govern the engine speed as a function of the scheduled speed Ngs and accelerates or decelerates the engine in a controlled manner to reach a new scheduled speed when the pilot or other system component changes the scheduled engine speed. Otherwise, for changes in engine environment such as altitude, temperature, pressure, or other factors the governor acts to maintain the scheduled speed Ngs.

To control accelerations or decelerations, the fuel control forms a demanded acceleration term Al which is preferably the difference between the scheduled speed Ngs and a demanded speed term Nd. Alternatively, the acceleration term Al can be formed as the difference between the HP spool speed signal, Nh, and the scheduled speed signal Ngs. However, the advantages of forming the acceleration term as a function of the demanded speed signal are set forth in the referenced Evans application. The differencing function is performed by feeding the two chosen parameters to a first summing junction 26 and generating a difference signal of sign and magnitude equivalent to the difference therebetween. The acceleration term or difference signal Al is integrated in an integrator 32 after passing through a select low gate 38 to become the demanded speed signal Nd. This portion of the control forms an integral loop providing a datum which is the demanded speed signal Nd.

Before the demanded acceleration term Al is passed through the select low gate 38 it is conventionally limited by a comparator circuit 28. The comparator 28 compares the acceleration term Al to an upper limit AL and a lower limit D1 and passes the acceleration term unmodified if it is between these two values. However, if the acceleration term is great enough to cause surge the acceleration term will be limited at the upper acceleration limit Al while if the deceleration is sufficient to cause flameout it will be limited at the lower deceleration limit D1. These demanded acceleration limits can either be fixed or variable.

An acel/decel limiter circuit 30 is used to generate the limits A1, D1 and to modify the limits as a function of a group of operating parameters of the engine if they are to be variable. If this is the case an acceleration limit schedule is stored in a memory device of the circuit 30 where the schedule is substantially equivalent to the steady-state surge line of a particular action expressed as a function of the engine operating parameters chosen.

An accel/decel limiter circuit of this type is more fully disclosed in a copending U.S. patent application Ser. No. 217,374, filed in the name of David J. Hawes on Dec. 17, 1980, which is commonly assigned with the present application. The disclosure of Hawes is hereby expressly incorporated by reference herein.

Thereafter, the demanded speed signal Nd is differenced with the HP spool speed, Nh, in a second summing circuit 34. An error signal E generated by this difference is then used to proportionally control the fuel flow to the engine 10 in a direction tending to null the error. In this manner, this portion of the controller forms a proportional control loop slaved to the datum Nd. For changes in the datum Nd the actual speed signal Nh will follow and change to where there is a steady state error E (indicative of a constant fuel flow) supporting the particular demanded speed.

The proportional control is developed by a hydromechanical unit (HMU) 36 which receives as an input the error signal E. The HMU 36 multiplies the error signal E by a predetermined gain to provide a fuel flow Wf which is proportional to the error. In its simplest form, if the error signal E is electrical, the HMU could be implemented as a proportional solenoid valve which changes position with respect to a control voltage representative of the error signal E to regulate fuel flow from a pressurized fuel source. The HMU 36 would therefore, also consist of a pressure regulator and a pressurized source of fuel (not shown) as is conventionally known in the art.

Additionally, the HMU 36 can include means for mechanically multiplying the error signal E by an input signal representative of the output of the compressor stages, compressor pressure Pc. In combination with the proportional solenoid the multiplying means could comprise a multiplying piston coupled to the fuel valve which transduces the compressor pressure Pc into a force to assist the solenoid. Thus, the error signal E at all engine operating points is proportional to the Wf/Pc or the fuel/air ratio of the engine. Because of the mechanical multiplication signal, the error signal E can be thought of as being generated as a function of the fuel/air ratio of the engine. Normally, this makes the scheduling of the speed signal Ngs much easier to implement.

Additionally included in the fuel control system 11 is a temperature limit circuit comprising a summing junction 44 and a scheduling means 40. The temperature limiter circuit obtains from the engine 10 a turbine inlet temperature signal Tt which is representative of the temperature of the high velocity exhaust gases approaching the turbine blades. The signal Tt can be generated by a conventional temperature sensor located in proximity to the turbine inlet as shown. Generally, in small engines the HP turbine inlet temperature is not measured because it is too hot for sensors. Instead, the inter-turbine temperature (ITT) is sensed and is used as an indicator of the turbine inlet temperature. The temperature signal Tt is then transmitted to the summing junction 44 where it is differenced with a turbine temperature reference Ttr. The reference Ttr is indicative of the physical temperature limit that the exhaust gas must not exceed if turbine damage is to be avoided. The difference signal generated from the summing means 44 is therefore, an indication of how close the engine is operating to its turbine temperature limit. This difference signal is transmitted to the scheduling means 40 and an acceleration or deceleration A2 is generated depending upon the magnitude and sign of the difference.

Similarly, an overspeed limiter circuit comprises a summing means 46 and a scheduling means 42. A speed signal Nl is obtained from the engine which is representative of the actual speed of the LP spool and is transmitted to the summing means 46. This actual speed Nl is differenced with an overspeed limit reference Nlr and a difference signal generated. The difference signal is indicative of the distance the engine is operating from the LP spool overspeed limit. The difference is transmitted to the scheduling means 42 and an acceleration or deceleration A2 is generated based upon the magnitude and sign of the difference signal.

Both of the outputs of the stress limiter circuits are combined with the demanded acceleration from limiter circuit 28 in the select low gate 38. This gate selects the lowest acceleration term and transmits it to the integrator 32 blocking all other acceleration terms. In this manner, the largest deceleration or smallest acceleration of the three terms is demanded from the system.

Normally, the acceleration term that is integrated to form the datum Nd is produced by the flow path from the Ngs signal through differencing circuit 26 and comparator 28. However, when either the overspeed limit or turbine temperature limit is approached the acceleration terms A2, A3 produced by the limiter circuits may become less than the scheduled acceleration. At that point the select low gate 38 will use the lower acceleration of the three to transmit to the integrator 32. If, for some reason, either of the limits are exceeded, then decelerations are scheduled directly for the system by the limiter circuits through the select low gate 38.

Figure 3:
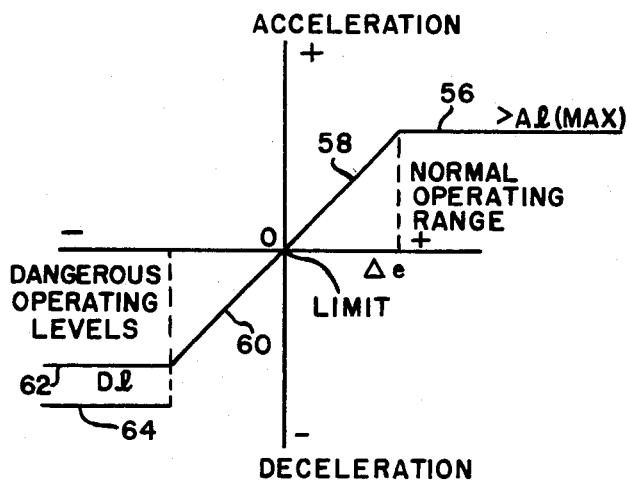
FIG. 3 is a generalized graphical representation for a stress limit schedule for the fuel control systems illustrated in FIGS. 1 and 2.

For a generalized discussion of the stress limiter schedules reference is now given to FIG. 3 where an acceleration and deceleration function is graphically illustrated as a function of the difference between a stress limit and the measured actual parameter. It can be seen that there is a region bounded by horizontal line 56 where the difference is positive and of a magnitude great enough such that the engine is not in danger or near a stress limit. This is considered the normal operating range of the engine and the acceleration scheduled for this area is a constant which is generally in excess of the normal operating accelerations of the engine.

When, however, the difference begins to approach zero which means that the engine is approaching a stress limit, smaller and smaller accelerations are scheduled. This is illustrated by the sloping portion of the curve 58. Preferably, this brings the engine into a zero acceleration state at the limit which is indicated as the origin 0 of the graph. The sloping portion of curve 58 is shown as a straight line, but could, in fact, be a more complex function decreasing with the magnitude of the limit difference.

For negative error values which indicate that the engine is operating beyond a limit, the decelerations are scheduled directly which is illustrated by the portion 60 of the curve. Portion 60 can additionally be more complex than the straight line shown. Once the error limit becomes more negative to where the engine begins operating in considerable excess of the stress limit there is a region which is dangerous to the equipment and could immediately cause catastrophic failure. Thus, the deceleration limit D1 of the engine is scheduled as illustrated by horizontal line 62. However, if preferred at this operating point several multiples of the deceleration limit D1 can be used as illustrated by line 64. The deceleration scheduled by line 64 can represent the maximum available or complete fuel cutoff to save the engine.

Figure 2:
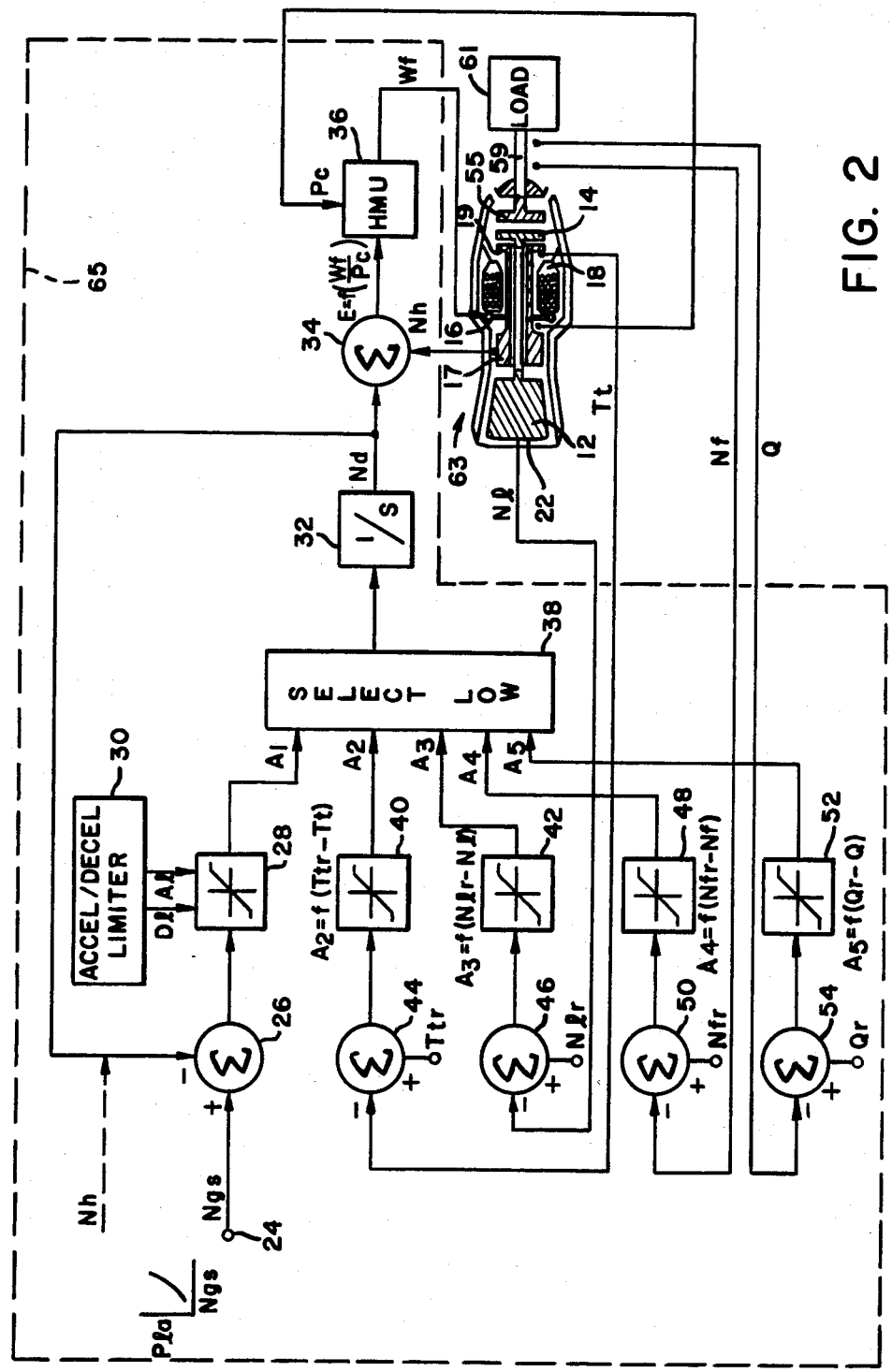
FIG. 2 is a system block diagrammatic view of a fuel control system for a free turbine engine including a stress limiter apparatus which is constructed in accordance with the invention.

In FIG. 2 there is shown a fuel control system 65 for a free turbine engine 63 which includes a gas generator of the general type used with the turbojet of the first Figure. Therefore, identical elements in FIGS. 1 and 2 are labeled with like references numerals. The free turbine engine contains a high pressure spool comprised of high pressure compressor 17 and high pressure turbine 19 and a low pressure spool comprised of low pressure compressor 12 and turbine 14. In addition, the fuel ring 16 and burners 18 are provided to produce a high velocity exhaust gas. But instead of producing a thrust or reaction force after expending a portion of its energy turning the turbines 14 and 19, the exhaust gas drives a free turbine 55. The free turbine 55 absorbs much of the exhaust gas energy to rotate a shaft 59 and power a load 61.

The fuel control 65 is identical to the one described in FIG. 1, except that two additional stress limiter circuits have been added. In particular, a free turbine overspeed stress limiter and a free turbine torque limiter have been added for the free turbine 55 of the engine 63. The overspeed limiter obtains a speed signal Nf which is indicative of the actual speed of the free turbine and transmits it to a summing junction 50. The speed signal Nf is then differenced with a free turbine reference speed limit Nfr to produce a difference signal which is fed to a scheduling means 48. The output of the scheduling means 48 which is an acceleration term A4, is transmitted to another input of the select low gate 38. Similarly, the torque limiter circuit obtains a signal Q indicative of the actual torque produced on the rotor shaft 59 of the free turbine engine 63. This torque signal Q is received by the summing junction 54 where it is differenced with a torque limit Qr. This difference is then fed to a scheduling means 52 the output of which is thereafter transmitted to another input of the select low gate 38 as an acceleration term A5.

These limiters act in a similar manner to those previously described for the temperature limit and LP spool overspeed limit. When the difference between the actual parameter and the limiting value approach zero a decreasing acceleration is scheduled. For negative values of the difference between the actual parameter and the limiting value, a deceleration is scheduled.

Figure 4:
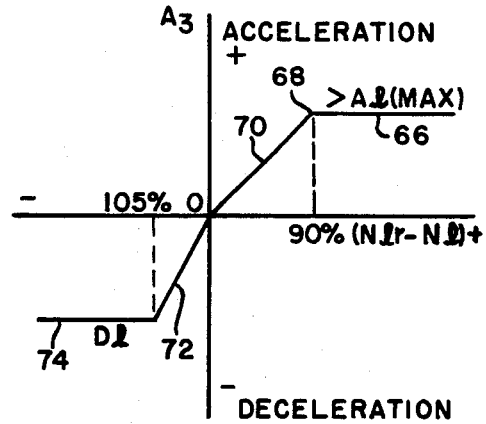
FIGS. 4, 5, 6, and 7 are graphical representations of actual stress limit schedules for the fuel control systems illustrated in FIGS. 1 and 2.

The implementations of the actual schedules will now be more fully described with reference to FIGS. 4–7. The preferred schedule for the LP spool overspeed limit is illustrated in FIG. 4 where line 66 is a constant scheduled acceleration greater than the demanded acceleration limit A1. The breakpoint 68 of this schedule occurs at a difference which is equivalent to 90% of the maximum designed speed of the LP spool. From this point to 100% of designed speed or the limit, the acceleration term A3 is scheduled along line 70 as a linearly decreasing variable to where it becomes zero at the origin. For spool speeds greater than the limit, an increasing deceleration is scheduled along line 72. It is noted that the slope of line 72 is greater than that of line 70 and thus, the decleration term becomes larger more rapidly than the acceleration term decreases.

This method provides a schedule where until 90% of max speed is reached no overspeed limiting is introduced into the system. Brisk accelerations to this point may be experienced by the engine under control of the acceleration term A1. However, once the system begins to approach the limit at 90% max speed, then the decreasing acceleration term prevents any demanded acceleration term from causing an excessive overshoot of the limit. Thereafter, rapidly increasing decelerations will be scheduled if the limit is exceeded. If the overspeed exceeds the max limit by more than 5%, then the schedule will provide a maximum deceleration at the demanded deceleration limit D1.

Figure 5:
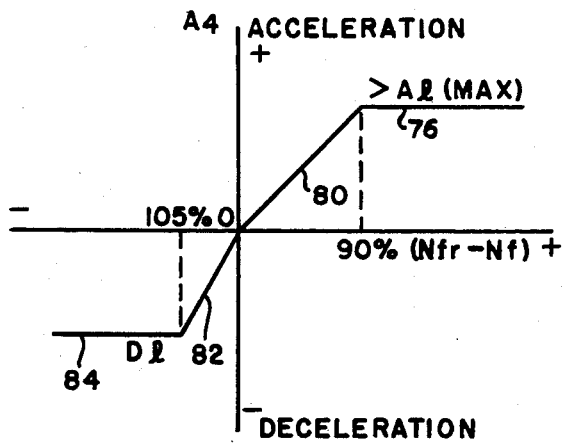

In FIG. 5, a schedule for the acceleration term A4 for the free turbine overspeed limit is illustrated. This schedule is similarly shaped to that shown in FIG. 4 because the overspeed stress limits for the gas generator spools and the free turbine are comparable. Thus, line segment 76 provides an acceleration greater than A1, line segment 80 provides decreasing positive accelerations, line segment 82 provides increasing decelerations of a greater slope, and line segment 84 provides a deceleration equal to the limit D1. The break points for the schedule are at 90% of limit for the upper limit and 105% of the max limit for the lower breakpoint.

Figure 6:
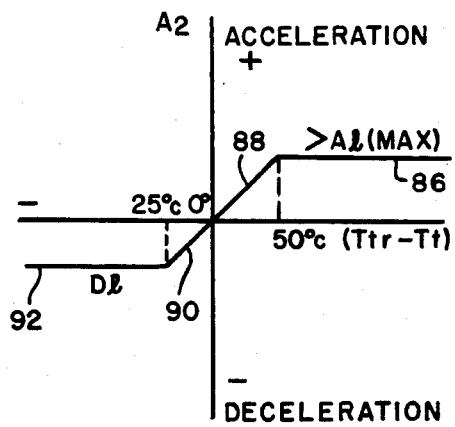

FIG. 6 is the preferred schedule for the turbine temperature limit. An acceleration term in excess of A1 is scheduled by line 86 and the deceleration limit D1 scheduled by line 92. Line segments 88, 90 connect the two horizontal lines through the origin. The breakpoints are shown as 50° C. under the limit and 25° C. over the limit.

Figure 7:
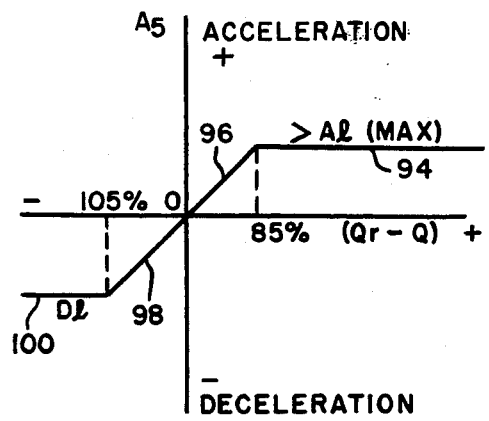

FIG. 7 is the preferred schedule for the torque limiter. The schedule includes line segments 96, 98 which linearly reduce accelerations between the two limiting values of horizontal lines 94 and 100. The upper breakpoint is set at 85% of maximum torque and the lower breakpoint set at 105% of the torque limit.

Figure 8:
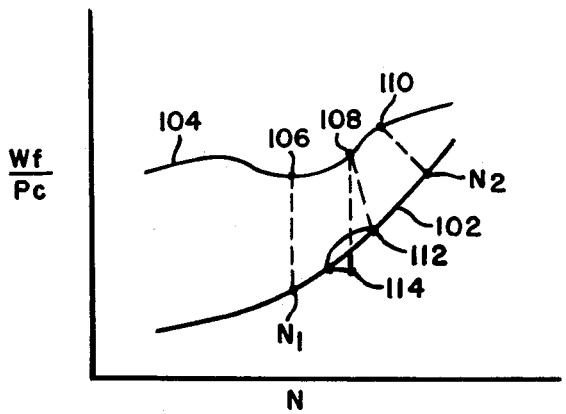
FIG. 8 is graphical representations of fuel/air ratio Wf/Pc as a function of engine speed N for the engines illustrated in FIGS. 1 and 2.

With respect to FIG. 8, there is illustrated a graphical represerepresentation of the change in fuel/air ratio Wf/Pc for differing engine speeds N. The curve 102 is the steady running line of the engine and represents the fuel/air ratio necessary to support certain engine speeds at the equilibrium of the controller. Curve 104 is a locus of fuel/air ratios above which the engine will surge for a particular engine speed. This generalized shape of the stall line and steady running line is conventional for the gas turbine engine disclosed and will not be further explained.

The curve 104 is useful in establishing the acceleration limit Al for a particular engine speed N. Since any fuel/air ratio along curve 102 will support the corresponding speed N, it follows that fuel/air ratios in excess of the steady running line will cause accelerations. These excess fuel/air ratios, however, must be limited to less than the stall line 104 or surging of the engine will occur. It is, thus, evident that the distance between the steady running line 102 and the stall line 104 is a measure of the acceleration limit Al. To obtain maximum response from the engine, the limit AL should be as near the stall line as possible.

With this in mind, typical operation during acceleration from an initial speed N1 to a scheduled speed N2 has the control varying the fuel/air ratio from the steady running line 102 to the stall line 104 at point 106. The acceleration scheduled will be the maximum available and thus will follow along the stall line to point 110. At this position, the fuel control will determine the acceleration needed to finally reach the scheduled speed N2 is less than the demanded acceleration limit. Thus, the fuel/air ration will be scheduled along the proportional governor line between point 110 and N2 where the engine speed reaches steady state.

While this acceleration is occurring, one of the stress limits of the engine may be approached or exceeded. If this happens and the actual measured parameter is in excess of the high breakpoint of the particular schedule, then the acceleration scheduled begins to decrease under control of the stress limiter and the "select low" gate. This decrease is illustrated along the line connecting point 108 where the high breakpoint of the schedule is exceeded and point 112 where the stress limit is reached and the acceleration of the engine is zero. It is noted that when the stress limit is reached, the engine is in a steady state operation and the control has been limited such that additional stress is not applied to the engine.

Figure 10:
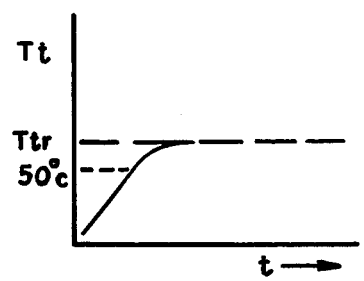
FIG. 10 is a graphical representation of the response of the present invention to exceeding the turbine temperature limit Ttr.

This action will cause a well behaved response while the engine approaches a stress limit. The designed response for the temperature limit is illustrated in FIG. 10, where as the actual parameter approaches the limit is rate of increase is being slowed after the breakpoint by decreasing the stress applied (acceleration). As the limit is reached, no overshoot will occur because at this point the acceleration stress has been reduced to zero.

Figure 9:
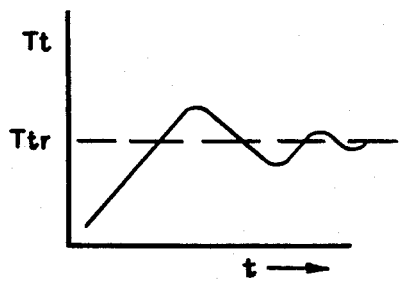
FIG. 9 is a graphical representation of the response of a prior art system to exceeding the turbine temperature limit Ttr.

If the acceleration were not reduced until the limit is reached, the delay in the response of the control would cause some overshoot. This response which is the conventional operation of many controls without the invention is illustrated in FIG. 9. These excursions of the temperature above the limit represent an unnecessary overstressing of the engine and those swings of the parameter below the limit represent an inefficient use of engine power.

Returning now to FIG. 8, if for some reason the stress limit is exceeded at point 108, then the fuel/air ratio is immediately scheduled below the steady running line at point 114. The scheduling of a fuel/air ratio below the steady running line will initiate a deceleration that will remove some stress from the engine and bring the overlimit parameter back into the normal range. The engine will start to accelerate again at a much reduced rate to maintain the parameter below the limit until an equilibrium speed is attained where the measured parameter is equal to the limit value at point 112.

While a detailed description of the preferred embodiments and implementations of the invention have been disclosed, it will be obvious to those skilled in the art that various modifications and changes may be made thereto without departing from the spirit and scope of the invention as is hereinafter defined in the appended claims.

What is claimed is:

1. A fuel control for gas turbine comprising:
   (a) means for controlling the fuel flow to the gas turbine engine as a function of a demanded speed signal;
   (b) means for generating said demanded speed signal as the time integral of a selected acceleration term;
   (c) means for generating a demanded acceleration term as a function of at least one operating parameter of the engine;
   (d) a plurality of summing means for generating difference signals between an actual parameter signal related to a stress limit and a predetermined limit value;
   (e) a plurality of scheduling means for determining stress limit acceleration terms as functions of the difference signals generated by said summing means; and
   (f) means for comparing said acceleration terms and for generating said elected acceleration term as the lowest of said acceleration terms, wherein said scheduling means provides:
      (i) a difference signal determined as a function having a maximum acceleration value exceeding the maximum value of said demanded acceleration for operation of the engine in a normal range, (ii) decreasing acceleration values for operation of the engine within a predetermined range of a stress limit, (iii) a zero acceleration value for operation of the engine at the stress limit, (iv) increasing deceleration values for operation of the engine beyond the stress limit, and (v) a maximum deceleration value for operation of the engine in a dangerous range.

2. A fuel control as defined in claim 1 wherein said stress limit acceleration term generating means includes:
   means for generating an actual parameter spool speed signal as a function of the actual spool speed of the gas turbine engine.

3. A fuel control as defined in claim 1 wherein said stress limit acceleration term generating means includes:
   means for generating an actual parameter turbine temperature signal as a function of the actual turbine inlet temperature of the engine.

4. A fuel control as defined in claim 1 wherein the engine is of the free turbine type and said stress limit acceleration term generating means includes:
   means for generating an actual parameter free turbine speed signal as a function of the actual free turbine speed of the engine.

5. A fuel control as defined in claim 1 wherein the engine is of the free turbine type and said stress limit acceleration term generating means includes:

means for generating an actual parameter free turbine torque signal as a function of the actual torque applied by the free turbine of the engine.

6. A fuel control for a gas turbine engine as defined in claim 1 wherein:

said stress limit is selected as the low pressure spool overspeed limit.

7. A fuel control for a gas turbine engine as defined in claim 6 wherein:

said decreasing acceleration values are selected to initiate when the low pressure spool speed reaches a predetermined percentage of the low pressure spool overspeed limit.

8. A fuel control for a gas turbine engine as defined in claim 7 wherein:

said maximum deceleration value is selected to initiate when the low pressure spool speed reaches a predetermined limit.

9. A fuel control for a gas turbine engine as defined in claim 8 wherein:

said maximum deceleration value is the maximum deceleration value of said demanded acceleration.

10. A fuel control for a gas turbine engine as defined in claim 1 wherein:

said stress limit is selected as the free turbine overspeed limit.

11. A fuel control for a gas turbine engine as defined in claim 10 wherein:

said decreasing acceleration values are selected to initiate when the free turbine speed reaches a predetermined percentage of the free turbine overspeed limit.

12. A fuel control for a gas turbine engine as defined in claim 11 wherein:

said maximum deceleration value is selected to initiate when the free turbine speed exceeds the free turbine overspeed limit by a predetermined percentage.

13. A fuel control for a gas turbine engine as defined in claim 12 wherein:

said maximum deceleration value is the maximum deceleration value of said demanded acceleration.

14. A fuel control for a gas turbine engine as defined in claim 1 wherein:

said stress limit is selected as the turbine inlet temperature limit.

15. A fuel control for a gas turbine engine as defined in claim 14 wherein:

said decreasing acceleration values are selected to initiate when the turbine inlet temperature exceeds the turbine inlet temperature limit by a predetermined amount.

16. A fuel control for a gas turbine engine as defined in claim 15 wherein:

said maximum deceleration value is selected to initiate when the turbine inlet temperature is within 50° C. of the turbine inlet temperature limit.

17. A fuel control for a gas turbine engine as defined in claim 16 wherein:

said maximum deceleration value is the maximum deceleration value of said demanded acceleration.

18. A fuel control for a gas turbine engine as defined in claim 1 wherein:

said stress limit is selected as the free turbine torque limit.

19. A fuel control for a gas turbine engine as defined in claim 18 wherein:

said decreasing acceleration values are selected to initiate when the free turbine torque reaches a predetermined percentage of the free turbine torque limit.

20. A fuel control for a gas turbine engine as defined in claim 19 wherein:

said maximum deceleration values are selected to initiate when the free turbine torque exceeds the free turbine torque limit by a predetermined amount.

21. A fuel control for a gas turbine engine as defined in claim 20 wherein:

said maximum deceleration value is the maximum deceleration value of said demanded acceleration.

* * * * *